United States Patent [19]

Larsen

[11] 4,285,263
[45] Aug. 25, 1981

[54] WIND-INSTRUMENT FINGERING GUIDE

[76] Inventor: Henry Larsen, 192 N. Main St., West Hartford, Conn. 06107

[21] Appl. No.: 18,726

[22] Filed: Mar. 8, 1979

[51] Int. Cl.² .............................................. G09B 15/06
[52] U.S. Cl. ...................................... 84/382; 84/453; 84/465
[58] Field of Search ..................... 84/380 R, 382, 453, 84/465, 485

[56] References Cited

U.S. PATENT DOCUMENTS

| 389,346 | 9/1888 | Utzinger | 84/382 X |
| 2,556,535 | 6/1951 | Hansen | 84/382 |
| 2,918,838 | 12/1959 | Worrel | 84/382 X |
| 4,099,442 | 7/1978 | Amadio | 84/382 |

Primary Examiner—Lawrence R. Franklin

[57] ABSTRACT

A finger guide for a clarinet has two substantially rectilinear rods that are connected by an offset-rod portion that holds the two rod portions in offset positions. Mounting posts on either end of the rectilinear rods fit in a sleeve extending radially from ring clamps that mount the finger guide on the clarinet. This allows the finger guide to be mounted with one rod portion on one side of a reference plane through the axes of the rest-position tone holes while the other rod portion is positioned on the other side of the reference plane. Tongue portions extend outward at the longitudinal positions of the little-finger keys to provide guidance for the little fingers.

11 Claims, 5 Drawing Figures

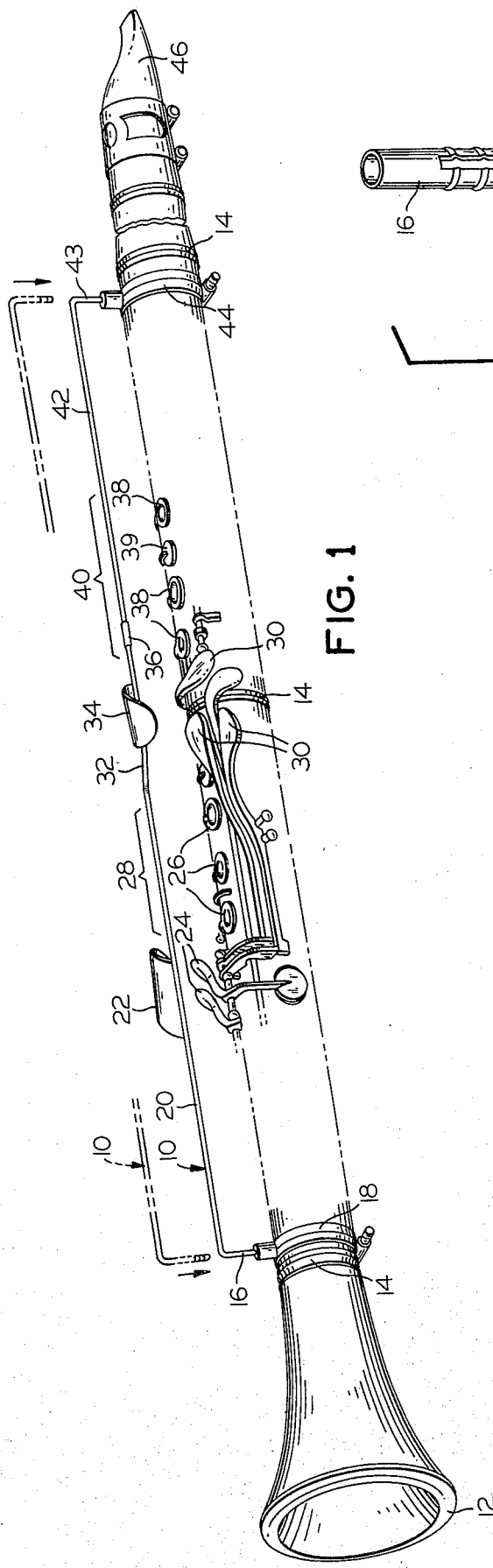
FIG. 1
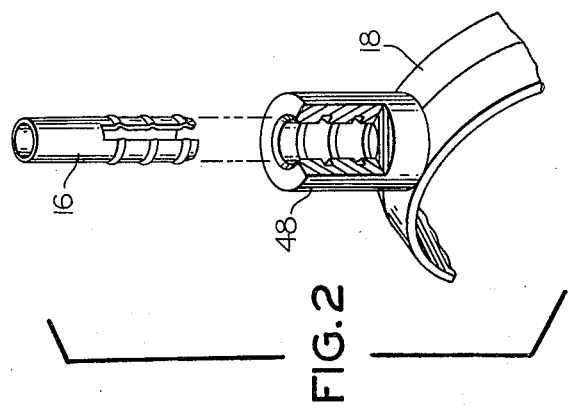
FIG. 2
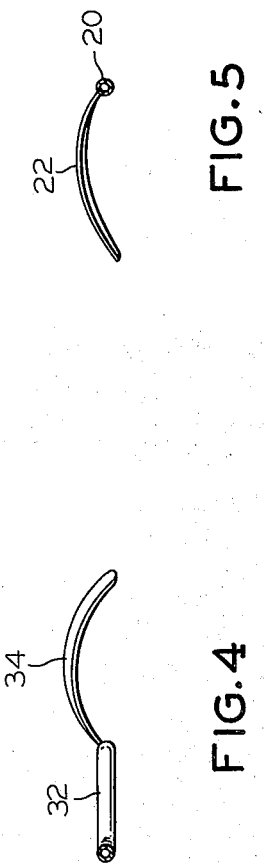
FIG. 5
FIG. 4

WIND-INSTRUMENT FINGERING GUIDE

BACKGROUND OF THE INVENTION

The present invention relates to finger guides for wind instruments and is particularly applicable to such guides as used on clarinets.

It is important for the beginning clarinet player to learn proper fingering techniques from the very beginning. Unfortunately, the beginning clarinet player is also faced with many other lessons that are to be learned from the very beginning, and concentration on proper fingering can easily fall by the wayside.

In order to overcome this problem, finger guides have been suggested that force the student to employ proper finger movements without requiring him to concentrate on the finger movements during his early lessons. An example of such a guide is illustrated in U.S. Pat. No. 2,556,535 to Hansen. The Hansen device includes a rod mounted parallel to the axis of a clarinet and spaced above the rest-position tone holes for the first three fingers of both hands. The rod is positioned in a common plane with the axes of the rest-position tone holes. The theory of operation is that the student is not permitted to raise his fingers by too great a height above the tone holes without interference from the finger guide. Although this arrangement appears quite practicable in theory, in actual practice it can often fail to prevent excessive movement of the fingers.

It is accordingly an object of the present invention to provide an improvement in prior-art finger so as to increase the effectiveness of the finger guide in preventing excessive finger movement. It is also an object of one version of the invention to serve as a guide not only for the first three fingers, but also for the fourth finger of both hands.

SUMMARY OF THE INVENTION

The foregoing and related objects are achieved in an improvement in the combination of a clarinet and a finger guide. The clarinet is of the type having three first rest-position tone holes for the first three fingers of one hand, at least one first fourth-finger key for the fourth finger of the one hand, three second rest-position tone holes for the first three fingers of the other hand, and at least one second fourth-finger key for the fourth finger of the other hand. The three first rest-position tone holes are longitudinally spaced along the clarinet from each other and from the three second rest-position tone holes, which are also longitudinally spaced along the clarinet from each other, and the axes of said first rest-position tone holes and the second rest-position tone holes lie in a reference plane. The finger guide is of the type that includes an elongated body member having a first portion at least as long as the longitudinal extension of the first rest-position tone holes. The body member also has a second portion at least as long as the longitudinal extension of the second rest-position tone holes. The second portion is longitudinally positioned relative to the first portion for simultaneous positioning of the first portion at the longitudinal location of the first rest-position tone holes and the second portion at the longitudinal location of the second rest-position tone holes. Further included by the finger guide are mounting means mounted on the clarinet and stably supporting the body member on it with the first and second portions positioned at the longitudinal locations of the first and second rest-position tone holes, respectively, and spaced from the clarinet to permit operation of the clarinet by fingers positioned between the clarinet and the body member. According to the improvement of the present invention, the mounting means supports the body member with the first portion spaced to the side of the reference plane where the one hand is to be positioned and the second portion spaced to the other side of the reference plane, where the other hand is to be positioned.

In the preferred embodiment the first portion of the body member includes a first substantially rectilinear rod extending through the longitudinal positions of the first rest-position tone holes. The second portion of the body member includes a second substantially rectilinear rod extending through the longitudinal positions of the second rest-position tone holes parallel to the first rectilinear rod and offset from it, there being an offset-rod portion extending between the rectilinear rods to hold them stably in position relative to each other. The first and second rods terminate in first and second mounting posts, respectively, and the mounting means include first and second ring-clamp means clamped about the clarinet and having first and second sleeves, respectively, extending radially outwardly from the ring-clamp means. The first and second sleeves receive the first and second mounting posts, respectively.

Further advantages are afforded if the first portion has a first fourth-finger part longitudinally positioned along the first portion of the body member at the longitudinal location of the first fourth-finger key and extending generally farther from the reference plane than does the part of the first portion at the location of the first rest-position tone holes and the second portion has a second fourth-finger part longitudinally positioned along the second portion at the longitudinal location of the second fourth-finger key and extending generally farther from the reference plane than does the part of the second portion of the body member at the location of the second rest-position tone holes. In the preferred embodiment the fourth-finger part of the first portion includes a first rigid sheet extending from the first rod and covering the first fourth-finger keys, and the fourth-finger part of the second portion includes a second rigid sheet extending from the second rod and covering the second fourth-finger keys.

The first and second portions of the body member are preferably spaced at least 0.4 cm. (0.16 in.) from the reference plane at the longitudinal locations of the first and second rest-position tone holes, respectively.

BRIEF DESCRIPTION OF THE DRAWINGS

These and further features and advantages of the present invention are described in connection with the attached drawings, in which:

FIG. 1 is a perspective view of a clarinet on which the finger guide of the present invention is mounted;

FIG. 2 is a perspective view of part of the ring clamp shown in FIG. 1 with the sleeve portion partly broken away and a mounting post shown removed from the sleeve portion;

FIG. 4 is a section of the finger guide with parts removed taken at line 4—4 of FIG. 3; and FIG. 5 is a section of the finger guide with parts removed taken at line 5—5 of FIG. 3.

DETAILED DESCRIPTION OF THE PREFERRED EMBODIMENT

Figure 3:
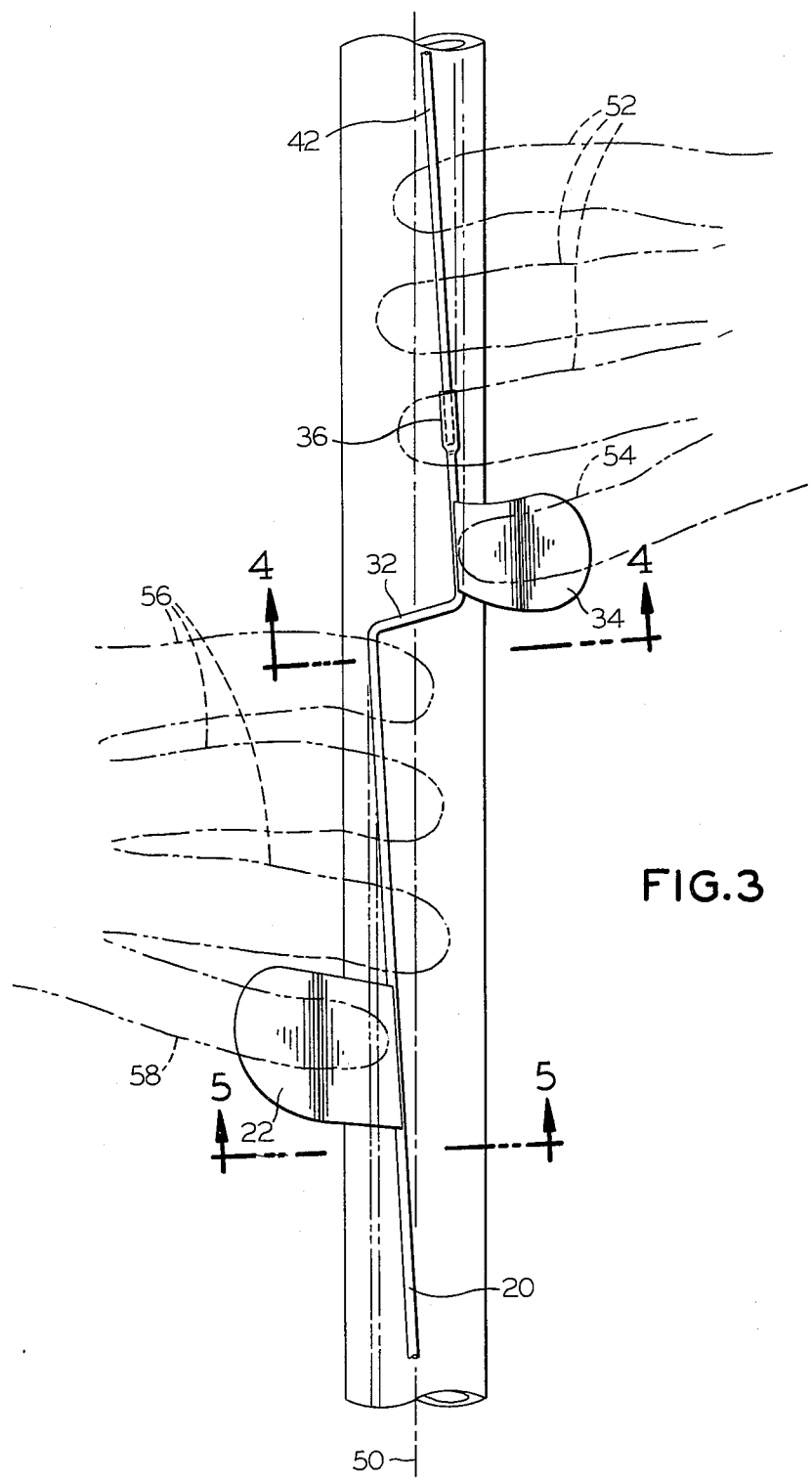
FIG. 3 is a simplified plan view of the finger guide of the present invention in position on the clarinet showing the normal rest positions of the fingers.

FIG. 1 shows in perspective a finger guide, indicated generally by reference numeral 10, that is mounted on a clarinet of conventional design. The clarinet has the customary bell 12 at the lower end and mouthpiece 46 at the upper end, and the model shown has the various segments of the clarinet connected at joints 14. The rest positions of the first three fingers of the right hand are at tone holes 26, while the first three fingers of the left hand rest on tone holes 38. A pad 39 is positioned between the rest position of the index finger and the middle finger of the left hand. The fourth or little finger of the left hand is used to operate keys 30 located just to the left in FIG. 1 of the rest-position tone holes 38, while the fourth finger of the right hand operates keys 24. It is to be noted that the axes of the rest-position tone holes lie in a common plane that bisects the clarinet. This common plane in which the axes of the rest-position tone holes lie will serve as a reference plane in the description below.

Finger guide 10 is mounted on the clarinet by means of ring clamps 18 and 44, each of which has a radially extending sleeve like sleeve 48 that extends radially from ring 18 in FIG. 2. The sleeves receive mounting posts 16 and 43 at either end of the elongated body member of the finger guide. The body member includes two substantially rectilinear rod portions 20 and 42 that are offset from each other and connected by an offset-rod portion 32, which can best be seen in FIG. 3. In the preferred embodiment, the elongated body member is provided in two pieces that are joined by a sleeve portion 36 of rod 20.

As can best be seen in FIG. 3, the finger guide provides a right-hand portion that extends over the longitudinal positions of the fingers of the right hand, while a left-hand portion is also provided that is spaced from the right-hand portion so as to extend over the longitudinal positions of the fingers of the left hand. It is a particularly advantageous feature of the present invention that the right-hand portion and the left-hand portion are offset from each other. More particularly, they are arranged on either side of a plane 50, which is the previously mentioned reference plane that contains the axes of the rest-position tone holes. Because of this offset arrangement, it is less likely that the fingers will escape confinement by the finer guide.

It will be noted in FIG. 3 that rod portions 20 and 42 are oriented at an angle to the reference plane 50 so as to meet reference plane 50 toward the ends. This is not a necessary orientation, but it illustrates that the finger guide can be adjusted to an extent by rotating the ring-clamp members 18 and 44. An alternte position, for instance, is illustrated in dashed lines in FIG. 3, which shows a position in which the rods extend substantially parallel to reference plane 50. It should be noted that it is necessary in either position for the guide member to be spaced from the reference plane over the rest-position tone holes regardless of the relative positions of the ends of the finger guide and the reference plane. In the preferred embodiment the parts of the rods at the longitudinal positions of the first three fingers of either hand are spaced from reference plane 50 by a little more than 0.7 cm. Of course, it is apparent that more or less spacing from the reference plane at that longitudinal location could also be employed, but it is thought that the particular advantages of the present invention are more pronounced if the spacing is at least about 0.4 cm.

An additional feature of the preferred embodiment of the present invention is the provision of means for controlling the fourth fingers of each hand, which are particularly prone to escape from a finger guide due to the relative length of the fourth finger and its position on the clarinet. As FIG. 3 shows, the first three fingers 52 and 56 on either hand actually intersect the reference plane 50, but the fourth fingers 54 and 58 are spaced from the reference plane due both to the length of the little finger and the fact that it is to manipulate keys 24 and 30 (FIG. 1). Four effective guiding of these fingers, tongue portions 22 and 34, which are rigid sheet members extending from the rod portions of the guide are provided at the longitudinal positions of the fourth-finger keys 24 and 30. The tongue portions 22 and 34 extend generally farther from the reference plane than do the parts 28 and 40 over the first three fingers of either hand, and they thereby accommodate the positioning of the fourth fingers.

FIGS. 4 and 5 indicate that tongue portions 34 and 22, respectively, may conveniently be curved to follow the general curvature of the finger in its playing position. Of course, the fourth-finger parts may be provided in designs other than a curved rigid-sheet member. For instance, a crook provided in the rod portion that extends outward at the position of the little finger would also serve to guide the fourth finger adequately, and an appropriately spiraled rod could also be employed to carry out the teachings of the present invention. However, the arrangement illustrated in the drawings is thought to be a rather convenient method of providing fourth-finger parts for the left- and right-hand portions of the finger guide.

It can be appreciated from the foregoing that a decided improvement over prior-art finger guides is provided by the teachings of the present invention. By spacing the right-hand portion to one side of the reference plane and the left-hand portion to the other, more effective guiding of the first three fingers is achieved. Furthermore, by extending the guide farther from the reference plane at the longitudinal positions of the fourth fingers, the fourth finger can also be confined. Finally, by providing a mounting means in the form of ring clamps that receive mounting posts on either end of the finger guide, a degree of adjustability is provided that permits the user to position the guide in an orientation that he finds most advantageous.

Having thus described the invention, I claim:

1. In the combination of:

a clarinet having three first rest-position tone holes for the first three fingers of one hand, at least one first fourth-finger key for the fourth finger of the one hand, three second rest-position tone holes for the first three fingers of the other hand, and at least one second fourth-finger key for the fourth finger of the other hand, said three first rest-position tone holes being longitudinally spaced along said clarinet from each other and from said three second rest-position tone holes, which are also longitudinally spaced along said clarinet from each other, the axes of said first rest-position tone holes and said second rest-position tone holes lying in a reference plane, with:

a finger guide including an elongate boy member having a first portion of said body member at least as long as the longitudinal extension of said first rest-position tone holes, said body member also having a second portion at least as long as the longitudinal extension of the second rest-position tone holes, said second portion being longitudinally positioned relative to said first portion for simultaneous positioning of said first portion at the longitudinal location of said first rest-position tone holes and said second portion at the longitudinal location of said second rest-position tone holes, said finger guide further including mounting means mounted on said clarinet and stably supporting said body member thereon with said first and second portions positioned at the longitudinal locations of said first and second rest-position tone holes, respectively, and spaced from said clarinet to permit operation of said clarinet by fingers positioned between said clarinet and said body member, the improvement wherein:

a. said mounting means supports said body member with said first portion spaced to the side of said reference plane where the one hand is to be positioned and said second portion spaced to the other side of the reference plane, where the other hand is to be positioned;

b. said first portion of said body member includes a first substantially rectilinear rod extending through the longitudinal positions of said first rest-position tone holes; and c. said second portion of said body member includes a second substantially rectilinear rod extending through the longitudinal positions of said second rest-position tone holes and parallel to said first rectilinear rod and offset therefrom, there being an offset-rod portion extending between said rectilinear rods to hold them stably in position relative to each other.

2. In the combination of:

a clarinet having three first rest-position tone holes for the first three fingers of one hand, at least one first fourth-finger key for the fourth finger of the one hand, three second rest-position tone holes for the first three fingers of the other hand, and at least one second fourth-finger key for the fourth finger of the other hand, said three first rest-position tone holes being longitudinally spaced along said clarinet from each other and from said three second rest-position tone holes, which are also longitudinally spaced along said clarinet from each other, the axes of first rest-position tone holes and said second rest-position tone holes lying in a reference plane, with:

a finger guide including an elongated body member having a first portion of said body member at least as long as the longitudinal extensions of said first rest-position tone holes, said body member also having a second portion at least as long as the longitudinal extension of the second rest-position tone holes, said second portion being longitudinally positioned relative to said first portion for simultaneous positioning of said first portion at the longitudinal location of said first rest-position tone holes and said second portion at the longitudinal location of said second rest-position tone holes, said finger guide further including mounting means mounted on said clarinet and stably supporting said body member thereon with said first and second portions positioned at the longitudinal locations of said first and second rest-position tone holes, respectively, and spaced from said clarinet to permit operation of said clarinet by fingers positioned between said clarinet and said body member, the improvement wherein:

a. said mounting means supports said body member with said first portion spaced to the side of said reference plane where the one hand is to be positioned and said second portion spaced to the other side of the reference plane, where the other hand is to be positioned;

b. said first portion has a first fourth-finger part longitudinally positioned along said first portion of said body member at the longitudinal location of said first fourth-finger key and extending generally farther from the reference plane than does the part of the first portion at the location of the first rest-position tone holes; and c. said second portion has a second fourth-finger part longitudinally positioned along said second portion at the longitudinal location of said second fourth-finger key and extending generally farther from the reference plane than does the part of the second portion of the body member at the location of the second rest-position tone holes.

3. The combination of claim 2 wherein said first portion of said body member includes a first substantially rectilinear rod extending through the longitudinal positions of said first rest-position tone holes, said second portion of said body member includes a second substantially rectilinear rod extending through the longitudinal positions of said second rest-position tone holes and parallel to said first rectilinear rod and offset therefrom, there being an offset-rod portion extending between said rectilinear rods to hold them stably in position relative to each other.

4. The combination of claim 3 wherein there are a first plurality of fourth-finger keys for the fourth finger of one hand and a second plurality of fourth-finger keys for the fourth finger of the other hand, said fourth-finger part of said first portion includes a first rigid sheet extending from said first rod and covering said first fourth-finger keys and said fourth-finger part of said second portion includes a second rigid sheet extending from said second rod and covering said second fourth-finger keys.

5. The combination of claim 4 wherein said first and second rods terminate in first and second mounting posts, respectively, said mounting means including first and second ring-clamp means clamped about said clarinet and having first and second sleeves, respectively, extending radially outwardly therefrom and receiving therein said first and second mounting posts, respectively.

6. The combination of claims 1, 2, 3, 4, or 5 wherein said first and second portions of said body member are spaced at least 0.4 cm (0.16 in.) from the reference plane at the longitudinal locations of said first and second rest-position tone holes, respectively.

7. A finger guide for a clarinet comprising:

a. an elongated body member having a first portion of said body member including a first substantially rectilinear rod at least as long as the longitudinal extension of the rest-position tone holes on the clarinet for the first three fingers of the one hand, and a second portion of said body member including a second substantially rectilinear rod at least as long as the longitudinal extension of the rest-position tone holes on the clarinet for the first three fingers of the other hand, said second rod extending substantially parallel to said first rod and being offset therefrom, there being an offset-rod portion of said body member extending between said first and second rods to hold them stably in position relative to each other, said second rod extending longitudinally relative to said first rod to permit simultaneous longitudinal positioning of said first and second rods at the rest-position tone holes for the one hand and the other hand, respectively; and b. mounting means stably supporting said body member thereon and with the axis of said body member extending relative to a predetermined axis and a predetermined reference plane through the predetermined axis, said predetermined axis and plane being fixed relative to said mounting means, said first portion extending to one side of the plane and said second portion extending to the other side of the plane, said mounting means being adapted for mounting on a clarinet with the predetermined axis coinciding with the axis of the clarinet and with the reference plane containing the axes of the rest-position tone holes, said mounting means being adapted for mounting thereof on the clarinet with said rods extending generally parallel to and spaced from the clarinet.

8. A finger guide for a clarinet comprising:

a. an elongated body member having a first portion of said body member at least as long as the longitudinal extension of the rest-position tone holes on a clarinet for the first three-fingers of the one hand and having a first fourth-finger part and a first three-finger part that are longitudinally positioned relative to each other along said first portion of said body member, positioning of said first fourth-finger part of said first portion of said body member being at the longitudinal location of the rest-position key on the clarinet for the fourth finger of the one hand while said first three-finger part is positioned at the longitudinal location of the rest-position tone holes of the first three fingers of the one hand, said body member also having a second portion of said body member at least as long as the longitudinal extension of the rest-position tone holes on the clarinet for the first three fingers of the other hand, said second portion of said body member extending longitudinally relative to said first portion to permit simultaneous longitudinal positioning of said first portion and second portion over the rest-position tone holes for the first three fingers of the one hand and of the other hand, respectively, said second portion of said body member having a second fourth-finger part and a second three-finger part that are longitudinally positioned relative to each other along said second portion of said body member for positioning of said fourth-finger part of said second position of said body member at the longitudinal location of the rest-position key on the clarinet for the fourth finger of the other hand while said second three-finger part of said second portion of said body member is positioned at the longitudinal location of the rest-position tone holes for the first three fingers of the other hand; and b. mounting means stably supporting said body member thereon and with the axis of said body member extending relative to a predetermined axis and a predetermined reference plane through the predetermined axis, and predetermined axis and plane being fixed relative to said mounting means, said first portion extending to one side of the plane and said second portion extending to the other side of the plane, said mounting means being adapted for mounting on a clarinet with the predetermined axis coinciding with the axis of the clarinet and with the reference plane containing the axis of the rest-position tone holes, said fourth-finger part of said first portion of said body member extending generally farther from the reference plane than does said first three-finger part of said first portion of said body member and said fourth-finger part of said second portion of said body member extending generally farther from the reference plane than does said second three-finger part of said body member.

9. The finger guide of claim 8 wherein said first portion of said body member includes a first substantially rectilinear rod at least as long as the longitudinal extension of the rest-position tone holes on the clarinet for the first three fingers of the one hand, said second portion of said body member includes a second substantially rectilinear rod at least as long as the longitudinal extension of the rest-position tone holes on the clarinet for the first three fingers of the other hand, said second rod extending substantially parallel to said first rod and being offset therefrom, there being an offset-rod portion of said body member extending between said first and second rod to hold them stably in position relative to each other, said second rod extending longitudinally relative to said first rod to permit simultaneous longitudinal positioning of said first and second rods at the rest-position tone holes for the one hand and the other hand, respectively, said mounting means being adapted for mounting thereof on the clarinet with said rod extending generally parallel to and spaced from the clarinet.

10. The finger guide of claim 9 wherein said fourth-finger part of said first portion of said body member includes a first rigid sheet extending from said first rod, said fourth-finger part of said second portion of said body member includes a second rigid sheet extending from said second rod, said rigid sheets being longitudinally located on said rods to permit simultaneous positioning of said first and second sheets over the first and second fourth-finger keys, respectively, on the clarinet while said first and second rods are positioned at the first and second rest-position tone holes, respectively.

11. The finger guide of claim 7, 8, 9, or 10 wherein each of said portions of said body member are spaced, along at least a part thereof, at least 0.4 cm. (0.16 in.) from the reference plane, said parts of said first and second portions of said body member that are spaced at least 0.4 cm. (0.16 in.) from the reference plane being longitudinally located relative to each other to permit simultaneous positioning over the rest-position tone holes for the one hand and the other hand, respectively.

* * * * *

UNITED STATES PATENT AND TRADEMARK OFFICE
CERTIFICATE OF CORRECTION

PATENT NO. : 4,285,263
DATED : August 25, 1981
INVENTOR(S) : HENRY LARSEN

It is certified that error appears in the above-identified patent and that said Letters Patent are hereby corrected as shown below:

Column 4, line 66, "elongate" should be -- elongated --; same line, "boy" should be -- body --

Column 5, line 49, after "of" insert -- said --; line 54, "extensions" should be -- extension --

Column 8, line 14, "axis" should be -- axes --

Signed and Sealed this

Second Day of February 1982

[SEAL]

Attest:

Attesting Officer

GERALD J. MOSSINGHOFF
Commissioner of Patents and Trademarks